(12) United States Patent
Swensen et al.

(10) Patent No.: US 7,100,925 B2
(45) Date of Patent: Sep. 5, 2006

(54) PRESSURE ENERGIZED METALLIC SEAL

(75) Inventors: Jeffrey Swensen, Eldersburg, MD (US); Stephen Rowland, Laurel, MD (US)

(73) Assignee: Perkin Elmer, Inc., Wellesley, MA (US)

( * ) Notice: Subject to any disclaimer, the term of this patent is extended or adjusted under 35 U.S.C. 154(b) by 149 days.

(21) Appl. No.: 10/630,779

(22) Filed: Jul. 31, 2003

(65) Prior Publication Data

US 2005/0023770 A1 Feb. 3, 2005

(51) Int. Cl.
F16J 15/02 (2006.01)
B21D 53/84 (2006.01)

(52) U.S. Cl. .................. 277/644; 277/647; 277/626; 29/888.3

(58) Field of Classification Search ............. 277/644, 277/647, 626, 438, 491; 29/888.3
See application file for complete search history.

(56) References Cited

U.S. PATENT DOCUMENTS

| | | | |
|---|---|---|---|
| 811,000 A | 1/1906 | Tompkins | |
| 1,539,222 A | 5/1925 | Turner | |
| 2,520,089 A | 8/1950 | Lippincott | |
| 2,867,482 A * | 1/1959 | Schmidt | 277/438 |
| 3,195,906 A * | 7/1965 | Moyers | 277/611 |
| 3,565,449 A | 2/1971 | Ascencio et al. | |
| 3,730,537 A | 5/1973 | Ward et al. | |
| 3,781,043 A | 12/1973 | Hagmann | |
| 4,188,037 A * | 2/1980 | Abbes et al. | 277/317 |
| 4,457,523 A * | 7/1984 | Halling et al. | 277/644 |
| 4,640,455 A * | 2/1987 | Grein et al. | 228/176 |
| 4,783,087 A | 11/1988 | DeCore et al. | |
| 4,891,117 A | 1/1990 | Gardner Sr. | |
| 4,915,397 A | 4/1990 | Nicholson | |
| 5,226,306 A | 7/1993 | Yoshino et al. | |
| 5,249,814 A | 10/1993 | Halling | |
| 5,301,075 A | 4/1994 | Takemoto | |
| 5,454,157 A | 10/1995 | Ananth et al. | |
| 5,505,498 A * | 4/1996 | Halling et al. | 285/111 |
| 5,630,593 A | 5/1997 | Swensen et al. | |
| 5,730,445 A | 3/1998 | Swensen et al. | |
| 5,793,566 A | 8/1998 | Scura et al. | |
| 6,042,121 A | 3/2000 | Ma et al. | |
| 6,231,050 B1 | 5/2001 | Raden | |
| 6,257,592 B1 | 7/2001 | Hashizawa et al. | |
| 6,260,854 B1 | 7/2001 | Lemon | |
| 6,367,803 B1 | 4/2002 | Loth | |
| 6,392,838 B1 | 5/2002 | Hearn et al. | |

OTHER PUBLICATIONS

EBI BossSeal; Advanced Products; catalogue; pp. C-32 and C-33.

* cited by examiner

*Primary Examiner*—Vishal Patel
(74) *Attorney, Agent, or Firm*—Global IP Counselors, LLP

(57) ABSTRACT

A pressure-energized, annular metallic seal is provided that includes a central annular portion and a pair of annular leg portions extending from the central portion. Each leg portion includes a convex sealing surface lying in sealing plane. One of the leg portions preferably has an annular flange offset from its sealing plane in an axial direction towards the sealing plane of the other leg portion. One of the leg portions preferably has at least one radially extending tab projecting further than adjacent parts of the seal. The seal is preferably manufactured by first cutting a first annular edge in a metallic sheet material, then bending the sheet material substantially into the shape of the seal, and then cutting a second annular edge to complete the shape of the seal. The second annular edge preferably defines the annular flange and/or the at least one tab.

64 Claims, 7 Drawing Sheets

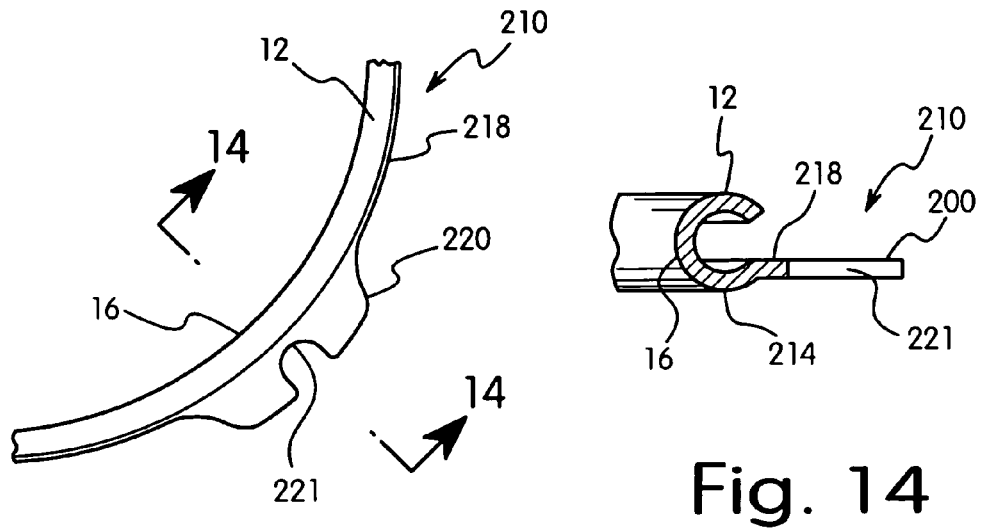
Fig. 13
Fig. 14
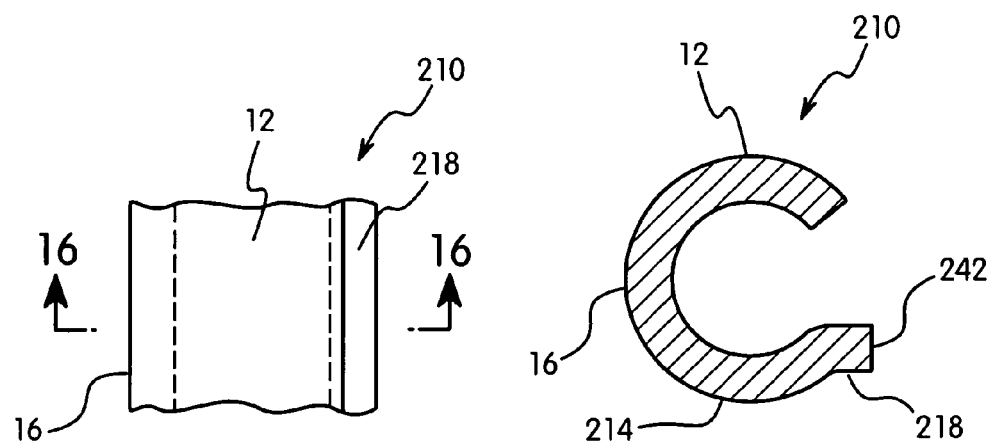
Fig. 15
Fig. 16

PRESSURE ENERGIZED METALLIC SEAL

BACKGROUND OF THE INVENTION

1. Field of the Invention

The present invention generally relates to a pressure-energized, metallic seal for sealing between a pair of axially facing annular surfaces. More specifically, the present invention relates to an annular metallic seal having an annular flange extending from one of the leg portions of the seal and/or at least one tab extending from one of the leg portions for handling, locating and/or orienting the seal. The present invention also relates to a method of manufacturing the pressure-energized, metallic seal of the present invention.

2. Background Information

Many different types of sealing devices exist for sealing two opposing surfaces to seal between or isolate opposite sides of the sealing device. In particular, annular sealing rings such as metallic O-rings are often used to seal opposing surfaces. These annular sealing rings are commonly made of metallic materials such as soft iron, carbon steel, stainless steel, high nickel alloy, Inconel or Nimonic alloys. Typically, conventional seals are manufactured by first cutting or punching "blank" rings of sheet metal out of metallic sheet material, and then bending each of the "blank" rings into the final desired cross-sectional shape using dies (i.e., a transfer press method). Alternatively, these typical annular sealing rings can be constructed by manually forming a band, butt welding the ends and then manually forming the required shape using progressive dies. A plating or coating can optionally be applied to the seals. These typical annular sealing rings can have cross-sections of various shapes. For example, a "C" seal or spring-energized "C" seal is typically an annular seal having a "C" shaped cross-section. Other types of known metallic seals have cross-sections which are parabolic, convoluted, "E" shaped, Y-shaped, omega-shaped (Ω-shaped), or the like.

Typical sealing rings (i.e., seals) generally function very well in certain applications. For example, some of these seals above perform very well under relatively large load forces (e.g., 100 to several thousand pounds per circumferential inch, pci), while others have been designed to function as low load seals such as the E-seal and Y-seal. Some of these typical metallic seals are designed to be pressure energized and/or can be coated with a deformable material (e.g., PTFE, gold, silver, copper, and the like) in order to achieve the desired seal integrity. Unfortunately, these typical sealing rings and the typical method of manufacturing these sealing rings have drawbacks.

In particular, typical seals often need to be handled by automated placement or even by hand due to difficulties in handling by automated placement. Specifically, during manufacturing of the seals, the seals often need to be handled in order to move the seals (e.g., to the next step in the manufacturing process). More specifically, during manufacture of the seals, the seals may need to be handled in order to hold, locate and/or orient the seals during certain processes (e.g., bending, coating and/or plating of the seals). Additionally, during manufacturing of the seals, the seals often need to be handled in order to move the seals for packaging. Finally, during installation of the seals, the seals often need to be handled or held in a particular location and/or orientation in order to ensure proper sealing.

Previous methods for handling plated seals have required gloved hands, sensitivity as to where you handle the seal being careful not to touch the critical sealing faces, and the possibilities of particle generation due to mishandling of the critical sealing faces, which is labor intensive and prohibitive to automated processes. Previous methods of making seals sometimes resulted in out of flatness conditions making it difficult to produce and handle seals in mass quantities and also making installation more time consuming. Lack of stability of seal shape could also lead to miss-alignment during installation leading to particle generation. These examples of problems making and using the prior seals are not exhaustive.

Some examples of known seals are disclosed in U.S. Pat. No. 5,730,445 to Swensen et al.; U.S. Pat. No. 5,630,593 to Swensen et al.; U.S. Pat. No. 5,249,814 to Halling; and U.S. Pat. No. 4,915,397 to Nicholson.

In view of the above, it will be apparent to those skilled in the art from this disclosure that there exists a need for an improved pressure-energized metallic seal and a method of manufacturing such a seal that overcome the problems in the prior art. This invention addresses these needs in the art as well as other needs, which will become apparent to those skilled in the art from this disclosure.

SUMMARY OF THE INVENTION

One object of the present invention is to provide a pressure energized, metallic annular seal that reliably seals a pair of annular, axially facing surfaces.

Another object of the present invention is to provide an annular seal, which can be easily produced and handled in mass quantities without negatively effecting sealing characteristics due to contact with the sealing surfaces of the seal.

Yet another object of the present invention is to provide an annular seal, which can be easily moved, packaged, located, oriented, aligned and/or installed without negatively effecting sealing characteristics due to contact with the sealing surfaces.

Yet another object of the present invention is to provide an annular seal that has a relatively stable, flat shape due to its cross-sectional profile. Moreover, the cross-sectional profile increases the stiffness or dimensional stability in the "plan direction", i.e., in the lateral direction when looking down on the seal, especially when the seal is configured with long flat sides such as a square, a rectangle, etc. In particular, the annular flange of the cross-sectional profile can stiffen the long flat sides.

Yet still another object of the present invention is to provide an annular seal with which installation can be performed both manually and using automated pick and place devices within assembly lines.

Yet still another object of the present invention is to provide an annular seal that can be used in the hard disk drive, automotive, power-generation, aerospace industries, semi-conductor industries, and any other industry that requires the above stated functionality.

Yet still another object of the present invention is to provide an improved method for manufacturing an improved annular seal that is simplified by using a minimum number of operations, such as by using a progressive press or progressive dies.

Yet still another object of the present invention is to provide an improved method for manufacturing an improved annular seal that adds stability to the progressive die process minimizing part deformation during the stamping process, thereby making the design more robust and manufacturable.

The foregoing objects can basically be attained by providing a pressure-energized, metallic seal for sealing axially facing annular surfaces. The seal comprises a central annular portion, a first annular leg portion and a second annular leg portion. The central annular portion extends around a central axis and has a first end and a second end. The first annular leg portion extends from the first end of the central portion to an annular first free end. The first annular leg portion has a first annular convex sealing surface lying in a first sealing plane. The second annular leg portion extends from the second end of the central portion to a second free end and has a second annular convex sealing surface lying in a second sealing plane. The second free end of the second leg portion has an annular flange extending substantially parallel to the first and second sealing planes and offset from the second sealing plane in an axial direction towards the first sealing plane.

The foregoing objects can also basically be attained by providing a pressure-energized, metallic seal for sealing axially facing annular surfaces. The seal comprises a central annular portion, a first annular leg portion and a second annular leg portion. The central annular portion extends around a central axis and has a first end and a second end. The first annular leg portion extends from the first end of the central portion to an annular first free end. The first annular leg portion has a first annular convex sealing surface lying in a first sealing plane. The second annular leg portion extends from the second end of the central portion to a second free end and has a second annular convex sealing surface lying in a second sealing plane. The second free end has at least one radially extending tab projecting further than adjacent parts of the seal.

The foregoing objects can also basically be attained by providing a method of manufacturing a pressure-energized, metallic seal. The method comprises feeding a metal sheet material, cutting a first annular edge, bending a portion of the metal sheet material and cutting a second annular edge. The metal sheet material is fed into a sheet metal forming machine. The first annular edge of the seal is cut in the metal sheet material such that it extends around a central axis. The portion of the metal sheet material is bent to form a cross-sectional profile of the pressure-energized, metallic seal that includes a central annular portion, a first annular leg portion and a second annular leg portion. The central annular portion extends around the central axis and has a first end and a second end. The first annular leg portion extends from the first end of the central portion to an annular first free end with the first annular edge. The first annular leg portion has a first annular convex sealing surface lying in a first sealing plane. The second annular leg portion extends from the second end of the central portion. The second annular leg portion has a second annular convex sealing surface lying in a second plane. The second annular edge of the seal in the metal sheet material is cut to form a second free end of the second leg portion having an annular flange extending substantially parallel to the first and second sealing planes and offset from the second sealing plane in an axial direction towards the first sealing plane.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIGS. 13 is an enlarged, partial side elevational view of a corner portion of the seal illustrated in FIGS. 11 and 12 identified by the circle 13 in FIG. 11;

FIG. 14 is a further enlarged partial, cross-sectional view of the corner portion of the seal illustrated in FIG. 13 as viewed along section line 14—14 of FIG. 13;

FIGS. 15 is an enlarged, partial side elevational view of a side portion of the seal illustrated in FIGS. 11 and 12 identified by the circle 15 in FIG. 11;

FIG. 16 is a partial, cross-sectional view of the portion of the seal illustrated in FIG. 15 as viewed along section line 16—16 of FIG. 15;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
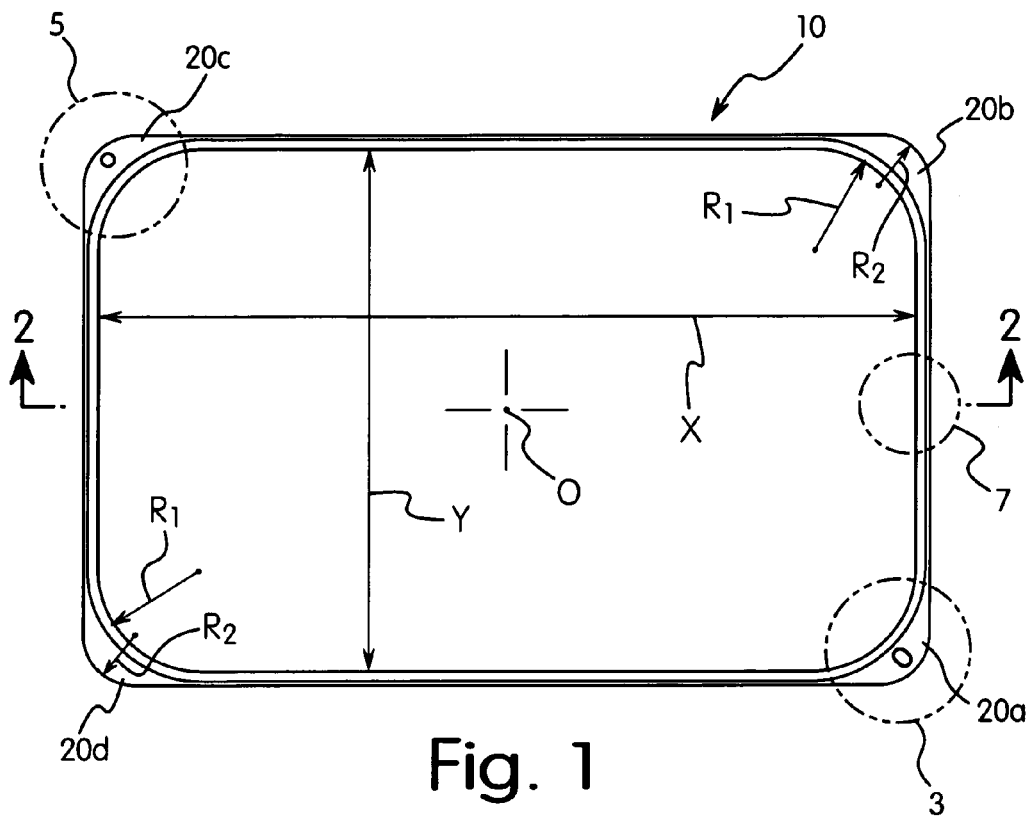
FIG. 1 is a side elevational view of a pressure-energized, metallic seal as viewed along a central axis in accordance with a first preferred embodiment of the present invention.
Figure 2:
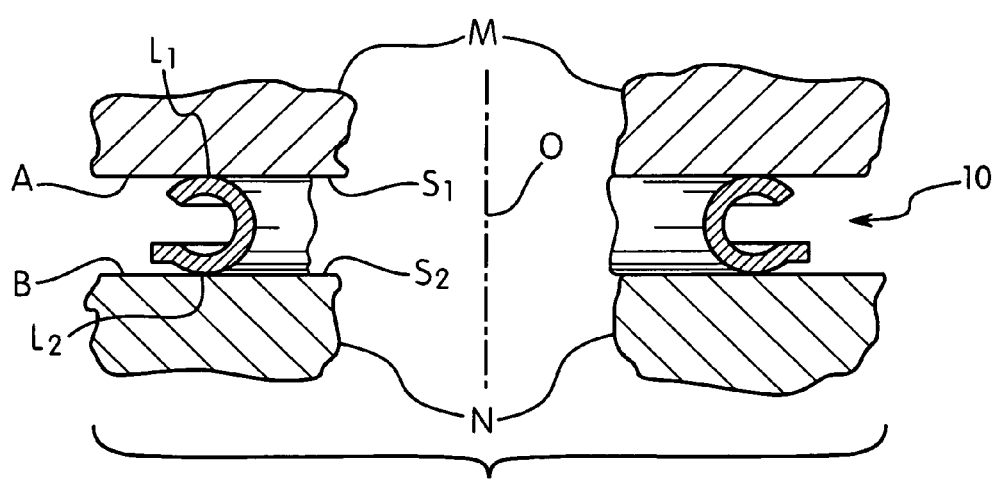
FIG. 2 is an enlarged partial, longitudinal cross-sectional view of the seal illustrated in FIG. 1 as viewed along section line 2—2 of FIG. 1, with the seal installed in a joint between a pair of annular, axially facing surfaces of a pair of members that are coupled together.

Referring initially to FIGS. 1 and 2, a metallic seal 10 that facilitates handling and installation of the seal 10 is illustrated in accordance with a first embodiment of the present invention. The seal 10 is preferably constructed using a method of manufacturing in accordance with the present invention, as discussed below in more detail. The metallic seal 10 is designed to be externally pressure energized to maintain a seal between a pair of members M and N. More specifically, the seal 10 is an annular seal designed to seal a pair of axially facing annular surfaces A and B of the members M and N, respectively. While the seal 10 is illustrated as being externally pressurized, it will be apparent to those skilled in the art from this disclosure that the seal 10 could be internally pressurized, as discussed below with reference to other preferred embodiments of the present invention.

The metallic seal 10 is preferably substantially rectangular shaped with rounded corners as viewed along a central axis O. Thus, the seal 10 is preferably non-circular shaped as viewed along the central axis O. However, it will be apparent to those skilled in the art from this disclosure that the seal 10 could have various other configurations, as needed and/or desired. For example, the seal 10 could have a circular configuration or another configuration, as needed and/or desired, and still be constructed in accordance with the present invention. Moreover, while the seal 10 illustrated herein is particularly useful in the semi-conductor industry where vacuum spaces need to be created, it will be apparent to those skilled in the art from this disclosure that the seal 10 could be used in other industries as needed and/or desired. For example, the seal 10 could be utilized in the aerospace industry or any other industry that requires the functionality of the seal 10.

Figure 3:
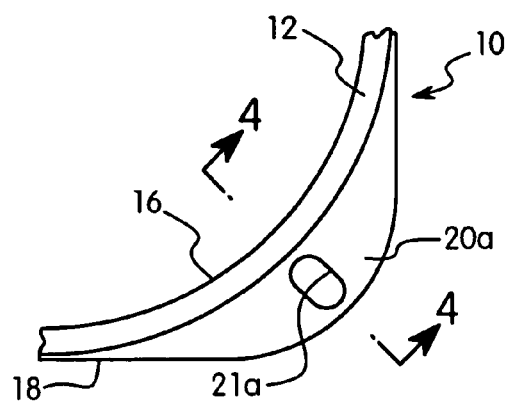
FIGS. 3 is an enlarged, partial side elevational view of a first corner portion of the seal illustrated in FIGS. 1 and 2 identified by the circle 3 in FIG. 1.
Figure 4:
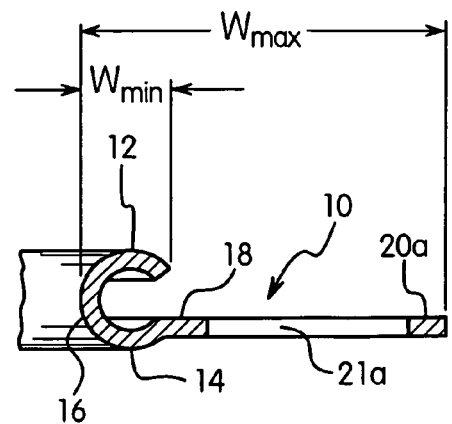
FIG. 4 is a further enlarged partial, cross-sectional view of the first corner portion of the seal illustrated in FIG. 3 as viewed along section line 4—4 of FIG. 3.
Figure 5:
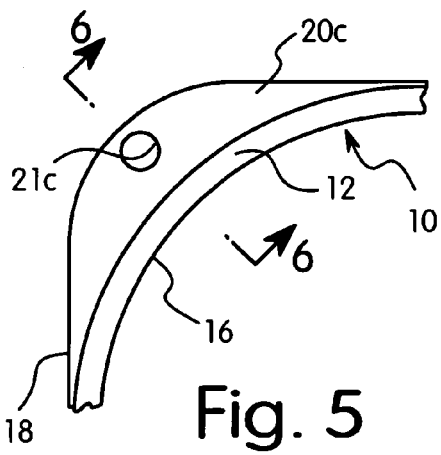
FIGS. 5 is an enlarged, partial side elevational view of a second corner portion of the seal illustrated in FIGS. 1 and 2 identified by the circle 5 in FIG. 1.
Figure 6:
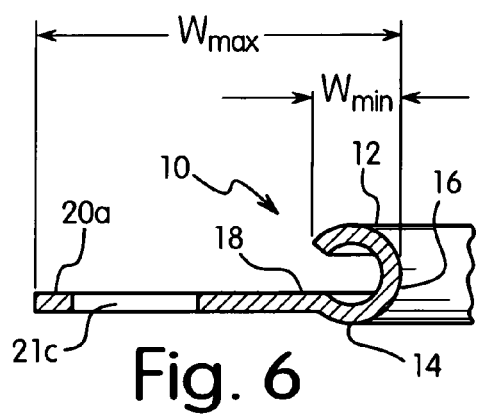
FIG. 6 is a further enlarged partial, cross-sectional view of the second corner portion of the seal illustrated in FIG. 5 as viewed along section line 6—6 of FIG. 5.
Figure 8:
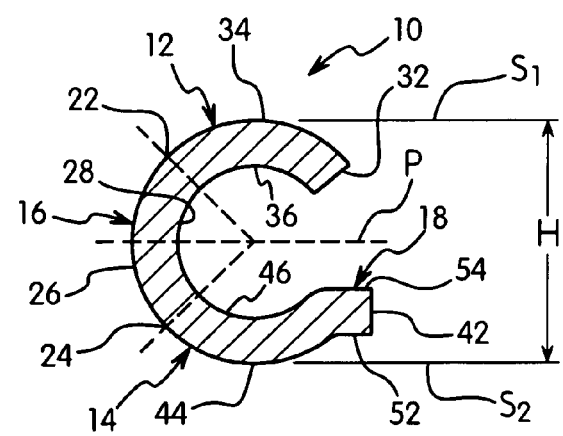
FIG. 8 is a partial, cross-sectional view of the side portion of the seal illustrated in FIG. 7 as viewed along section line 8—8 of FIG. 7.

Referring now to FIGS. 4, 6 and 8, the seal 10 basically includes a first annular leg portion 12, a second annular leg portion 14 and an annular connecting portion 16. The first and second leg portions 12 and 14 are connected to each other by the connecting portion 16 to form a modified C-shaped cross-sectional shape, as best seen in FIGS. 2, 4, 6 and 8. Specifically, as seen in FIGS. 1, 3 and 5, the second leg portion 14 includes an annular flange 18 with a plurality of tabs 20a, 20b, 20c and 20d extending radially from the flange 18 relative to the central axis O in order to form the modified C-shaped cross-sectional shape.

The tabs 20a, 20b, 20c and 20d are arranged at the rounded corners of the rectangular shaped seal 10. The tabs 20a, 20b, 20c and 20d project further in a radial direction than adjacent parts of annular flange 18. The tabs 20a, 20b, 20c and 20d are used to handle, locate and orient the seal during manufacture and installation. The leg portions 12 and 14, the connecting portion 16 and the flange 18 are all concentric about the central axis O of the seal 10. Thus, the leg portions 12 and 14, the connecting portion 16 and the flange 18 all extend around the central axis O of the seal 10. The tabs 20a, 20b, 20c and 20d are circumferentially spaced around the seal 10, while the flange 18 is continuous around the circumference of the seal 10. The flange 18 and the tabs 20a, 20b, 20c and 20d increase rigidity and stiffness of the seal 10 relative to a C-seal without the flange 18 and the tabs 20a, 20b, 20c and 20d. Due to the arrangement of the flange 18 and the tabs 20a, 20b, 20c and 20d, a transverse center plane P divides the seal 10 into two asymmetrical halves. The center plane P passes through the central axis O and is preferably substantially perpendicular to the central axis O. The structure of the flange 18 and the tabs 20a, 20b, 20c and 20d will be discussed in more detail below.

As seen in FIG. 8, the central annular portion 16 includes a first end 22, a second end 24, an outer convex connecting surface 26 and an inner concave connecting surface 28. The outer and inner connecting surfaces 26 and 28 are curved surfaces. The outer and inner connecting surfaces 26 and 28 extend between the first and second ends 22 and 24 of the central annular portion 16. The first leg portion 12 extends from the first end 22 of the central annular portion 16, while the second leg portion 14 extends from the second end 14 of the central annular portion 16.

The first annular leg portion 12 includes an annular first free end 32, a first annular convex outer sealing surface 34 and a first concave interior surface 36. The first sealing surface 34 and the first interior surface 36 are curved surfaces. The first sealing surface 34 extends from the first free end 32 of the first annular leg portion 12 to the first end 22 of the central annular portion 16 (i.e., to the outer connecting surface 26). The first interior surface 36 also extends from the first free end 32 of the first annular leg portion 12 to the first end 22 of the central annular portion 16 (i.e., to the inner connecting surface 26). The first sealing surface 34 lies in a first sealing plane $S_1$ that is substantially parallel to the center plane P of the seal 10. In particular, a first sealing line $L_1$ of the first sealing surface 34 lies in the first sealing plane $S_1$.

The second annular leg portion 14 includes an annular second free end 42, a second annular convex outer sealing surface 44 and a second concave interior surface 46. The second sealing surface 44 and the second interior surface 46 are curved surfaces. The second free end 42 includes the annular flange 18 and the tabs 20a, 20b, 20c and 20d. The second sealing surface 44 extends from the second free end 42 of the second annular leg portion 14 to the second end 24 of the central annular portion 16 (i.e., from the annular flange 18 to the outer connecting surface 26). The second sealing surface 44 lies in a second sealing plane $S_2$ that is substantially parallel to the center plane P of the seal 10. In particular, a second sealing line $L_2$ of the second sealing surface 44 lies in the second sealing plane $S_2$.

If the seal 10 is compressed between the annular surface A and B of the members M and N and/or when the seal 10 is pressure energized, a pair of conventional sealing dams (not shown) are formed that lie in the first and second sealing planes $S_1$ and $S_2$. Thus, the first and second sealing planes $S_1$ and $S_2$ are preferably substantially parallel to each other.

Figure 7:
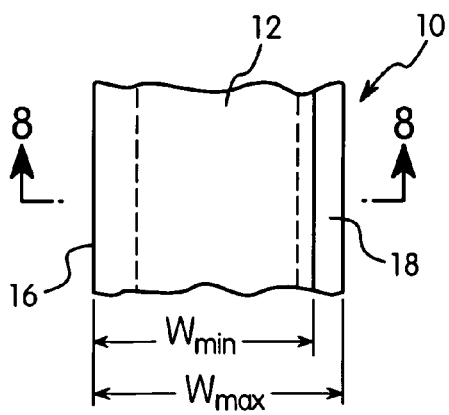
FIGS. 7 is an enlarged, partial side elevational view of a side portion of the seal illustrated in FIGS. 1 and 2 identified by the circle 7 in FIG. 1.

The annular flange 18 basically includes an annular outer flat surface 52 and an annular inner flat surface 54 with an annular free edge of the second free end 42 extending therebetween. The outer and inner flat surfaces 52 and 54 of the annular flange 18 are preferably substantially parallel to each other and substantially parallel to the center plane P. Moreover, the outer and inner flat surfaces 52 and 54 of the annular flange 18 are preferably offset from the second sealing plane $S_2$ in the axial direction toward the first sealing plane $S_1$. In this embodiment, the annular flange 18 of the second free end 42 extends in a radial direction away from central annular portion 16 at least as far as the first free end 32 of the first leg portion 12. More specifically, the annular flange 18 with the tabs 20a, 20b, 20c and 20d preferably extends in a radial direction away from central annular portion 16 beyond the first free end 32 of the first leg portion 12 such that the annular free ends surface 56 is located completely radially beyond the first free end 32 of the first leg portion 12, as best seen in FIGS. 3, 5 and 7.

The second free end 42 extends outwardly in the radial direction relative to the remainder of the annular flange 18 in order to form the tabs 20a, 20b, 20c and 20d. In other words, the outer and inner flat surfaces 52 and 54 (i.e., at the tabs 20a, 20b, 20c and 20d) of the flange 18 extend radially beyond the adjacent parts of the annular flange 18. Thus, the tabs 20a, 20b, 20c and 20d preferably extend radially further than adjacent parts of the entire seal 10. The seal 10 preferably has a constant cross-sectional shape around its periphery, except at the corners where the tabs 20a, 20b, 20c and 20d are located.

The tabs 20a, 20b, 20c and 20d preferably have identical overall shapes as seen in FIG. 1. Moreover, the tabs 20a, 20b, 20c and 20d are preferably peripherally spaced from each other such that one of the tabs 20a, 20b, 20c and 20d is located at each corner portion, as also best seen in FIG. 1. Preferably the tabs 20a and 20c have openings 21a and 21c formed therein, respectively. In any case, preferably, at least two of the tabs 20a, 20b, 20c and 20d have an axial opening formed therein. Of course, all of the tabs 20a, 20b, 20c and 20d can have openings as needed and/or desired. The opening 21a is preferably slightly elongated, while the opening 21c is preferably circular shaped. Of course, it will be apparent to those skilled in the art from this disclosure that the tabs 20a, 20b, 20c and 20d can have other configurations and could be identical as needed and/or desired. For example, some other configurations are discussed below in reference to other preferred embodiments of the present invention.

Preferred dimensions of one example of the seal 10 will now be discussed in more detail. Of course, it will be apparent to those skilled in the art from this disclosure that the seal 10 could have other dimensions as needed and/or desired, without departing from the scope of the present invention. The dimensions discussed herein are prior to any deformation of the seal 10 that might occur during installation. Preferably, the seal 10 has a constant thickness between about 0.005 inch and about 0.020 inch. In the illustrated embodiment, the seal 10 preferably has a uniform thickness of about 0.012 inch ±0.001 inch. As mentioned above, the seal 10 preferably has a constant, continuous, cross-sectional shape, except at the corners where the tabs 20a, 20b, 20c and 20d extend radially outwardly from the flange 18. Moreover, the central portion 16, the first leg portion 12 and the second leg portion 14 are preferably constructed together as a one-piece, unitary member.

Of course, it will be apparent to those skilled in the art that the seal 10 could be constructed by welding two halves together along the central plane of the seal. Preferably, each half of such seal would be manufactured in accordance with the present invention.

The seal 10 in the illustrated embodiment is elongated in one direction. For example, the seal 10 preferably has an overall length X of about 5 inches, while the seal 10 preferably has an overall width Y of about 3½ inches. The length X and the width Y are measured between the radially inner edges of the seal 10 (i.e., between opposing edges of the outer convex connecting surface 26 of the central annular portion 16). At each corner portion, the seal 10 has in inner radius of curvature $R_1$ and an outer radius of curvature $R_2$. The inner radius of curvature $R_1$ is preferably about 0.653 inch, while the outer radius of curvature $R_2$ is preferably about 0.300 inch.

The seal 10 preferably has a varying maximum cross-sectional width $W_{max}$ around the seal 10, a minimum cross-sectional width $W_{min}$ around the entire seal 10, and a height H around the entire seal 10. In other words, the seal 10 preferably has a constant minimum cross-sectional width $W_{min}$ around the entire seal 10, and a constant height H around the entire seal 10. However, at the corners, the maximum cross-sectional width $W_{max}$ increases. Specifically, the maximum cross-sectional width $W_{max}$ is about 0.060 inch around the entire periphery of the seal 10, except where the tabs 20a, 20b, 20c and 20d extend radially outwardly from the annular flange 18. At the tabs 20a, 20b, 20c and 20d, the maximum cross-sectional width $W_{max}$ increases from about 0.060 inch to about 0.231 inch. The minimum radial width $W_{min}$ is preferably about 0.055 inch around the entire periphery of the seal 10. The height H is preferably about 0.062 inch around the entire periphery of the seal 10. Thus, the height H of the seal 10 is larger than its cross-sectional width except at the corner portions.

The outer connecting surface 26, the first convex sealing surface 34 and the second convex sealing surface 44 preferably connect to each other to form a contiguous outer curved surface with a constant outer radius of curvature. Similarly, the inner connecting surface 28, the first interior surface 36 and the second interior surface 46 preferably connect to each other to form a contiguous inner curved surface with a constant inner radius of curvature. The outer flat surface 52 preferably extends from the second sealing surface 44 about 0.010 inch, except at the corners of the seal 10. The axial opening 21a preferably measures about 0.085 inch by about 0.125 inch, while the axial opening 21c preferably has a diameter of about 0.085 inch. In any case, the seal 10 preferably has a substantially C-shaped transverse cross-sectional shape as viewed in a peripheral direction with the annular flange 18 extending from one leg of the C-shaped cross-sectional shape.

The seal 10 performs the sealing function between the members M and N in a conventional manner, i.e., in a manner substantially identical to conventional C-seals on the market. In other words, the manner in which the first and second sealing surfaces 34 and 44 form a seal between the annular surfaces A and B of the members M and N, respectively, is conventional. Thus, the manner in which the seal 10 seals will not be discussed and/or illustrated in details herein. However, the seal 10 with modified shape described above achieves the aforementioned objects of the invention in addition to performing a reliable sealing function, and can be manufactured and installed in accordance with the present invention.

The seal 10 is preferably a "pressure-energized" seal 10, as mentioned above. Thus, the seal 10 is designed to have a higher pressure area located radially on one side. In the illustrated embodiment, higher pressure should be located on the outside (i.e., radially outwardly) of the seal 10 such that the higher pressure is applied to the internal curved surface to press the first and second sealing surfaces 34 and 44 against the annular surfaces A and B. In order to be pressure energized, a pressure difference needs to exist between the interior and exterior spaces relative to the seal 10. This pressure difference can be created by increased pressure on one side, or by decreased pressure (e.g., a vacuum) on the other side. In either case, the seal 10 will be effectively "pressure-energized".

Figure 9:
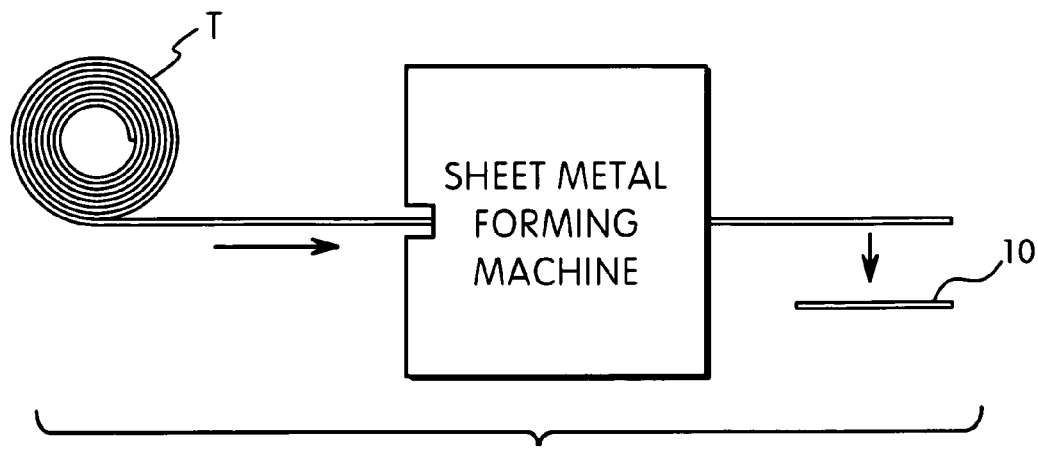
FIG. 9 is a diagrammatic view generally illustrating the method of manufacturing the seal illustrated in FIGS. 1–8.
Figure 10:
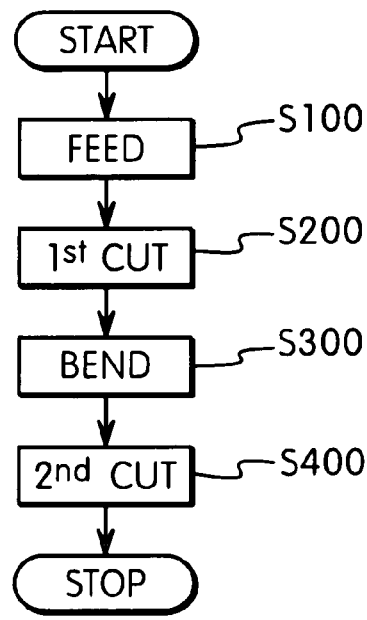
FIG. 10 is a flow diagram illustrating the method steps for manufacturing the seal illustrated in FIGS. 1–8.
Figure 11:
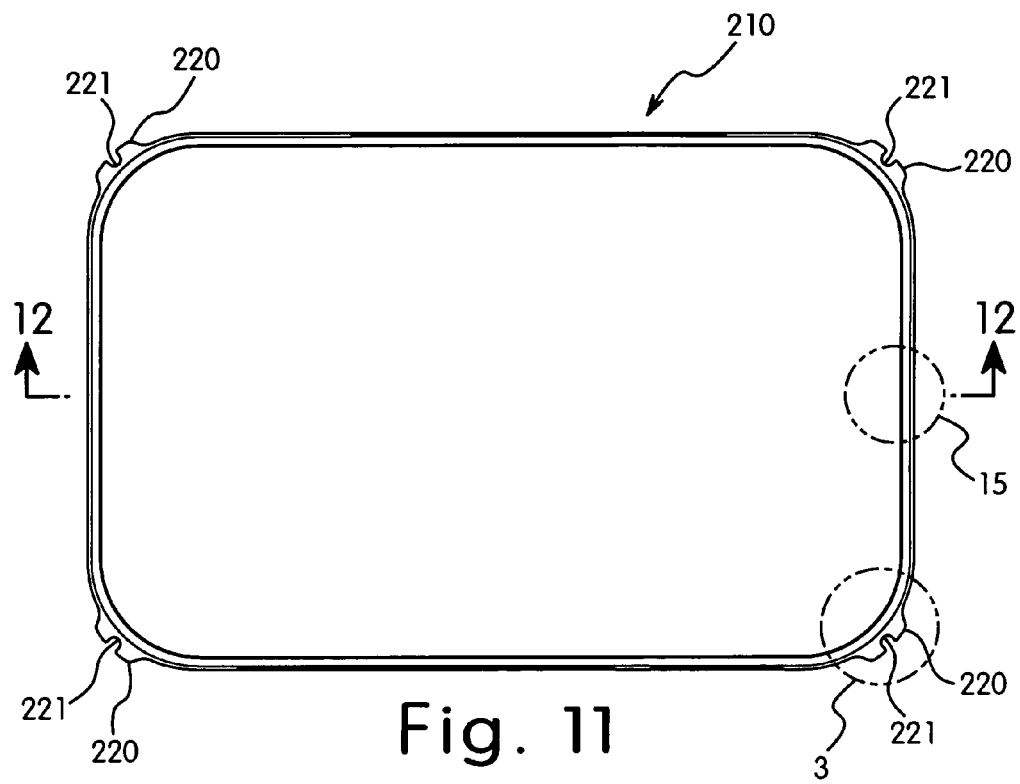
FIG. 11 is a side elevational view of a pressure-energized, metallic seal as viewed along a central axis in accordance with a second preferred embodiment of the present invention.
Figure 12:
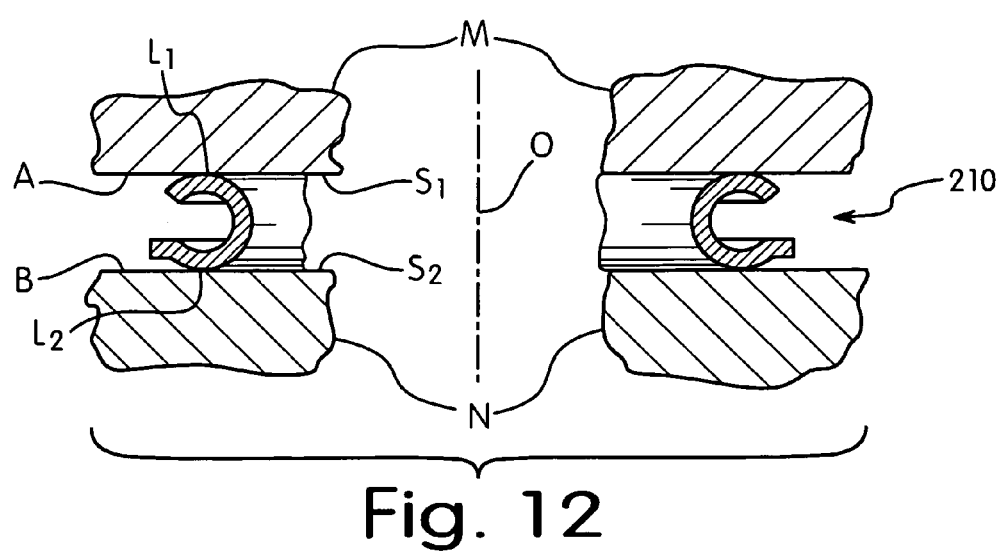
FIG. 12 is an enlarged partial, longitudinal cross-sectional view of the seal illustrated in FIG. 11 as viewed along section line 12—12 of FIG. 11, with the seal installed in a joint between a pair of annular, axially facing surfaces of a pair of members that are coupled together.

Referring mainly to FIGS. 9 and 10, a preferred method of manufacturing the pressure-energized, metallic seal 10 will now be discussed in more detail. Preferably, the method of manufacturing the seal 10 is an automated or computer controlled method rather than a manual method. First, a metal sheet material T is provided such as in a roll or the like. The metal sheet material T can be 300 Series Stainless Steel, Inconel X-750, Waspaloy, or any other material appropriate for the particular operating conditions. In the illustrated embodiment, the metal sheet material T acts as a carrier for holding the seal 10 as it is being formed. Of course, individual sheets of metal sheet material can be used instead of a roll of continuous metal sheet material. In step S100, the metal sheet material T is fed into a sheet metal forming machine in a conventional manner. The sheet metal forming machine is preferably an automated cutting, feeding and progressive pressing machine. Next, in step S200 the metal sheet material T is cut such that the material which will subsequently be bent to form the seal 10 remains with the metal sheet material T. In the first embodiment, the center of the seal 10 is cut out. This first cut (S200) forms the first free end surface 38 (i.e., a first annular edge) of the pressure-energized, metallic seal 10 in the metal sheet material T that extends around the central axis O.

Next, in step S300, progressive bending operations are performed. Preferably, the edge formed by the first cut is bent out of the plane of the metal sheet material T by the by one or more automated (e.g., automatic or computer controlled) progressive dies of the sheet metal forming machine. This bending of the metal sheet material T of step S300 forms the basic cross-sectional profile of the pressure-energized, metallic seal 10 described above (i.e., the central annular portion 16, the first annular leg portion 12 with the first annular convex sealing surface 34, and the second annular leg portion 14 with the second annular convex sealing surface 44). During the bend operation (or multiple bend operations) of step S300, the seal 10 remains intact with the continuous web of the metal sheet material T. Thus, the second annular leg portion 14 is still attached to the web of the metal sheet material T. After the bending step S300, the partially formed seal 10 of the metal sheet material T extends outwardly from the plane of the metal sheet material T.

Next, in step S400, a second or final cut is made in the metal sheet material T to complete the seal 10. Thus, this final cut separates the finished seal 10 from the remainder of the metal sheet material T. Accordingly, the free end 42 (i.e., a second annular edge) of the pressure-energized, metallic seal 10 is formed. During this second or final cutting step S400, the axial openings 21a and 21c are preferably also cut in the tabs 20a and 20c, respectively. Preferably, the cutting steps of the method are achieved by automated punching or the like.

The bending of step S300 is preferably performed using one or more progressive dies that are automated for consistency and accuracy. In other words, an automated progressive pressing operation is preferably utilized in bending the metal sheet material T. The cutting of the first annular edge (i.e., the first free end surface 38) of the pressure-energized, metallic seal preferably occurs before the bending of the portion of the metal sheet material T. Also, the bending of the portion of the metal sheet material T preferably occurs before the cutting of the second annular edge (i.e., the second free end 42) of the pressure-energized, metallic seal 10. During the bending of the portion of the metal sheet material T, the first annular edge (i.e., the first free end surface 38) is moved axially and then radially outwardly relative to a main plane of the metal sheet material T.

As used herein, the following directional terms "radially, axially, peripherally, circumferentially" as well as any other similar directional terms refer to those directions of an annular sealing member extending around a center axis in accordance with the present invention. Accordingly, these terms, as utilized to describe the present invention should be interpreted relative to the center axis with the present invention.

SECOND EMBODIMENT

Referring now to FIGS. 11–16, a pressure-energized seal 210 in accordance with a second embodiment of the present invention will now be explained. The seal 210 of this second embodiment is identical to the seal 10 of the first embodiment, except the seal 210 includes a plurality of (four) modified tabs 220. In view of the similarity between the first and second embodiments, the parts of the second embodiment that are identical to the parts of the first embodiment will be given the same reference numerals as the parts of the first embodiment. Moreover, the parts of this second embodiment that are identical to the parts of the first embodiment will not be discussed and/or illustrated in detail herein. Rather, the following descriptions and illustrations will focus mainly on the differences between this second embodiment and the first embodiment. Accordingly, it will be apparent to those skilled in the art from this disclosure that the descriptions and illustrations of the first embodiment also apply to this second embodiment, except as explained and illustrated herein.

The seal 210 basically includes a first annular leg portion 12, a modified second annular leg portion 214 and a central annular portion 16. The second annular leg portion 214 is identical to the second annular leg portion 14 of the first embodiment, except the second annular leg portion 214 includes a modified second free end 242 with a modified annular flange 218. The second free end 242 of the second annular leg portion 214 is identical to the second free end 42 of the first embodiment, except that the second free end 242 includes the modified tabs 220. In other words, the annular flange 218 is identical to the annular flange 18 of the first embodiment, except the annular flange 218 includes the modified tabs 220.

The tabs 220 of this second embodiment are identical to each other. Each tab 220 has cross-sectional width smaller than the tabs 20a, 20b, 20c and 20d of the first embodiment. Thus, the seal 210 preferably has a maximum cross-sectional width that is less than about 0.231 inch (i.e., the overall maximum cross-sectional width $W_{max}$ of the first embodiment) at the corners. Other than the corners where the tabs 220 are located, the seal 210 has dimensions identical to the seal 10 of the first embodiment. Preferably, at least two of the tabs 220 includes an axially extending opening 221. More specifically, each of the tabs 220 preferably includes an axially extending opening 221. Each axially extending opening 221 is preferably formed as an open ended slot that is open in the radially outward direction. Each of the tabs 220 has a smaller and different overall shape than the tabs 20a, 20b, 20c and 20d of the first embodiment.

The seal 210 is basically manufactured using the method described above in reference to the seal 10 of the first embodiment. However, it will be apparent to those skilled in the art that the metal forming machine described above would have to be slightly modified (i.e., re-tooled) in order to create the modified shape of the seal 210. In particular, the second cutting step described above would use a modified punch or die in order to create the modified tabs 220.

THIRD EMBODIMENT

Figure 17:
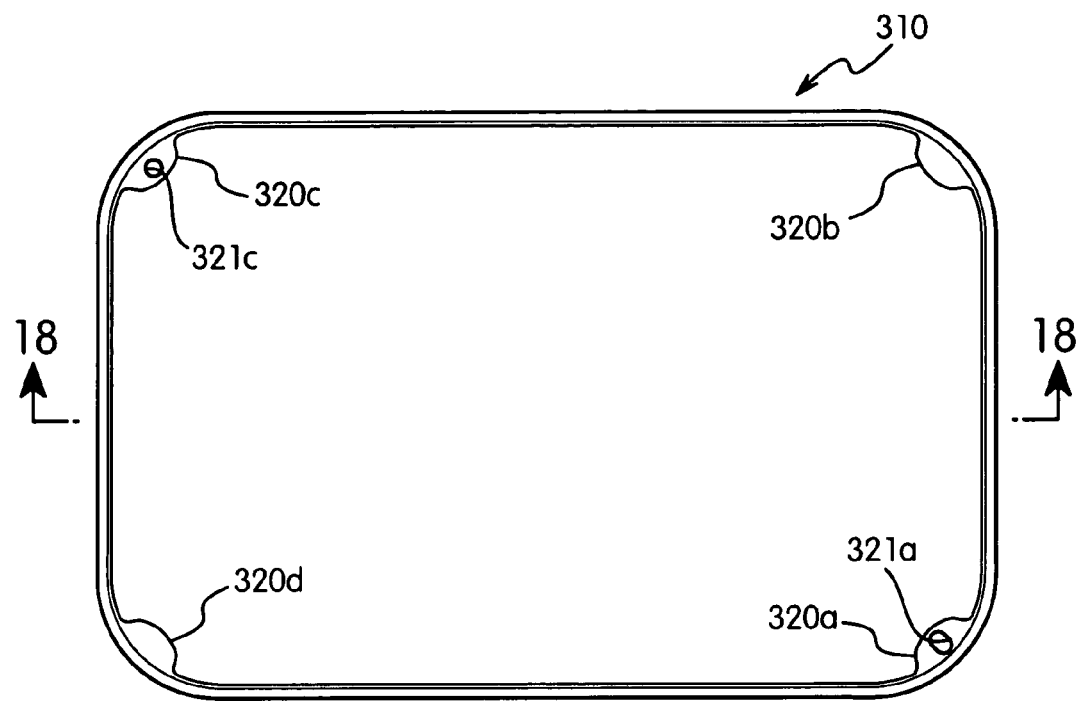
FIG. 17 is a side elevational view of a pressure-energized, metallic seal as viewed along a central axis in accordance with a third preferred embodiment of the present invention.
Figure 18:
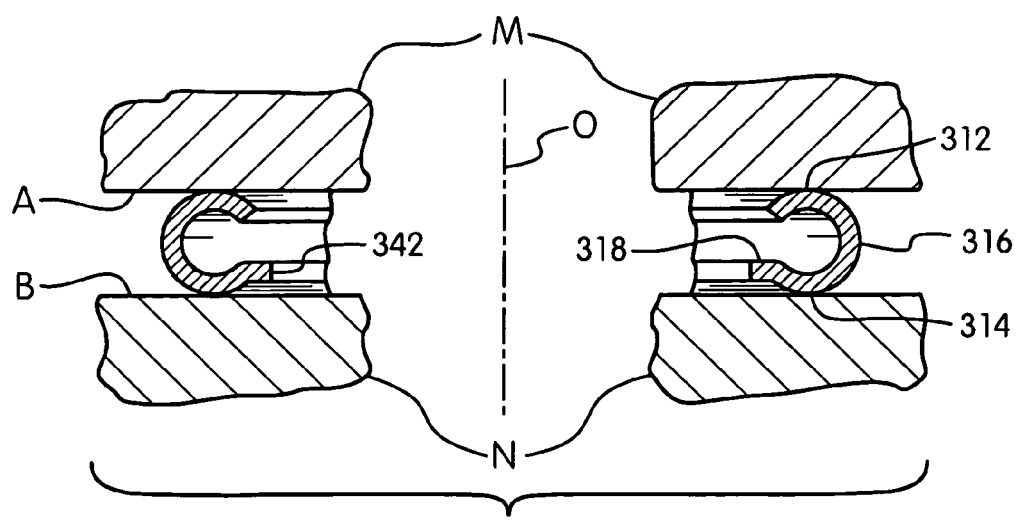
FIG. 18 is an enlarged partial, longitudinal cross-sectional view of the seal illustrated in FIG. 17 as viewed along section line 18—18 of FIG. 17, with the seal installed in a joint between a pair of annular, axially facing surfaces of a pair of members that are coupled together.

Referring now to FIGS. 17 and 18, an internally pressure-energized seal 310 in accordance with a third embodiment of the present invention will now be explained. The parts of the third embodiment that are identical to the parts of the first embodiment will be given the same reference numerals as the parts of the first embodiment. The seal 310 of this third embodiment is basically identical to the seal 10 of the first embodiment, except the seal 310 is designed to be internally pressure energized. In other words, the seal 310 of this third embodiment has a reversed cross-sectional shape such that the seal 310 can be internally pressure-energized, as best seen in FIG. 18. In view of the similarity between the first and third embodiments, this third embodiment will not be discussed and/or illustrated in detail herein. Rather, the following descriptions and illustrations will focus mainly on the differences between this third embodiment and the first embodiment. Accordingly, it will be apparent to those skilled in the art from this disclosure that the descriptions and illustrations of the first embodiment also apply to this third embodiment, except as explained and illustrated herein.

The seal 310 basically includes a first annular leg portion 312, a second annular leg portion 314 and a central annular portion 316. The first annular leg portion 312 has a cross-sectional shape identical the first annular leg portion 12 of the first embodiment, except the first annular leg portion 312 extends radially inwardly from the central annular portion 316. Similarly, the second annular leg portion 314 has a cross-sectional shape identical to the second annular leg portion 14 of the first embodiment, except the second annular leg portion 314 extends radially inwardly from the central annular portion 316. Thus, the second annular leg portion 314 includes a second free end 342 with an annular flange 318 having a plurality of tabs 320a, 320b, 320c and 320d. The tabs 320a and 320c have axially extending openings 321a and 321c formed therein, respectively. The flange 318 and the tabs 320a, 320b, 320c and 320d extend radially inwardly from the second annular leg portion 314 toward the central axis O of the seal 310. In other words, the annular flange 318 is basically identical to the annular flange 18 of the first embodiment, except the annular flange 318 extends radially inwardly. Of course, it will be apparent to those skilled in the art from this disclosure that the cross-sectional shape of the annular flange 318 needs to be slightly modified at the corners of the seal 310 in order to accommodate the reversed tabs 320a, 320b, 320c and 320d.

The seal 310 is basically manufactured using the method described above in reference to the seal 10 of the first embodiment. However, it will be apparent to those skilled in the art that the metal forming machine described above would have to be slightly modified (i.e., re-tooled) in order to create the modified shape of the seal 310. In particular, due to the reversed arrangement of the seal 310, the first annular edge (i.e., a first free end surface 338 of the first annular leg portion 312) is moved axially and radially inwardly relative to the central axis O of the seal 310 during the bending of the portion of the metal sheet material such that the first and second annular leg portions 312 and 314 extend inwardly from the central annular portion 316 in a radial direction toward the central axis O. Additionally, the first cutting occurs at a radial location further from the central axis O than the second cutting, rather than closer to the central axis O as in the first embodiment.

FOURTH EMBODIMENT

Figure 19:
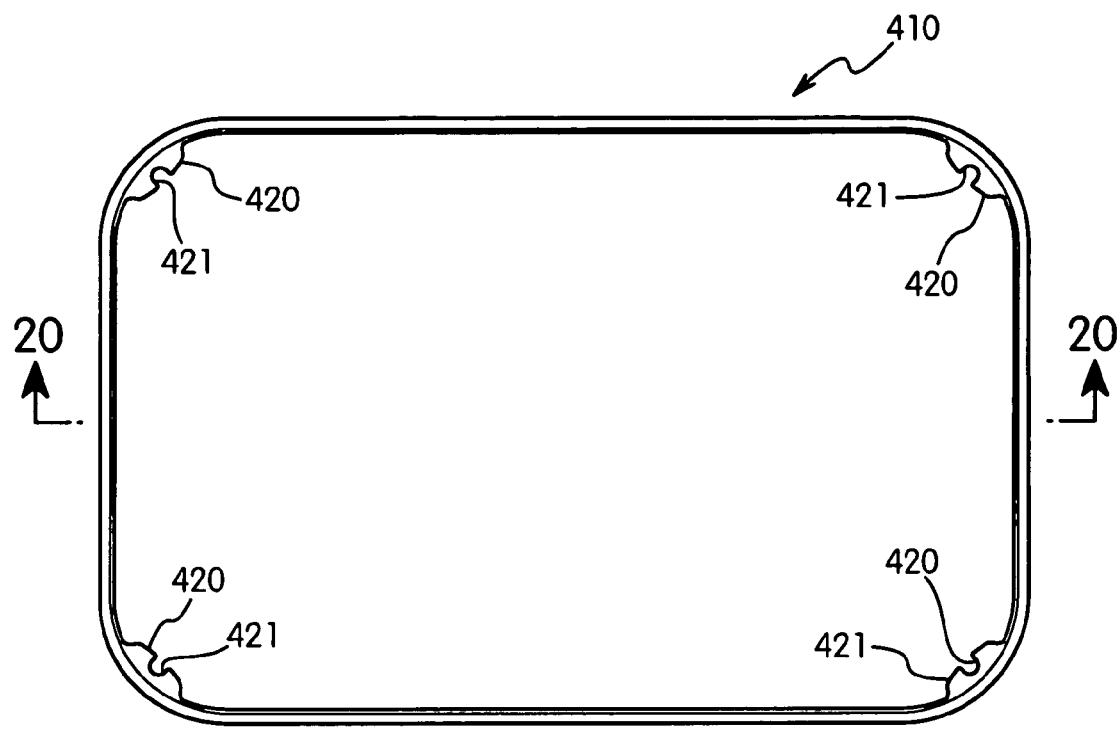
FIG. 19 is a side elevational view of a pressure-energized, metallic seal as viewed along a central axis in accordance with a fourth preferred embodiment of the present invention.
Figure 20:
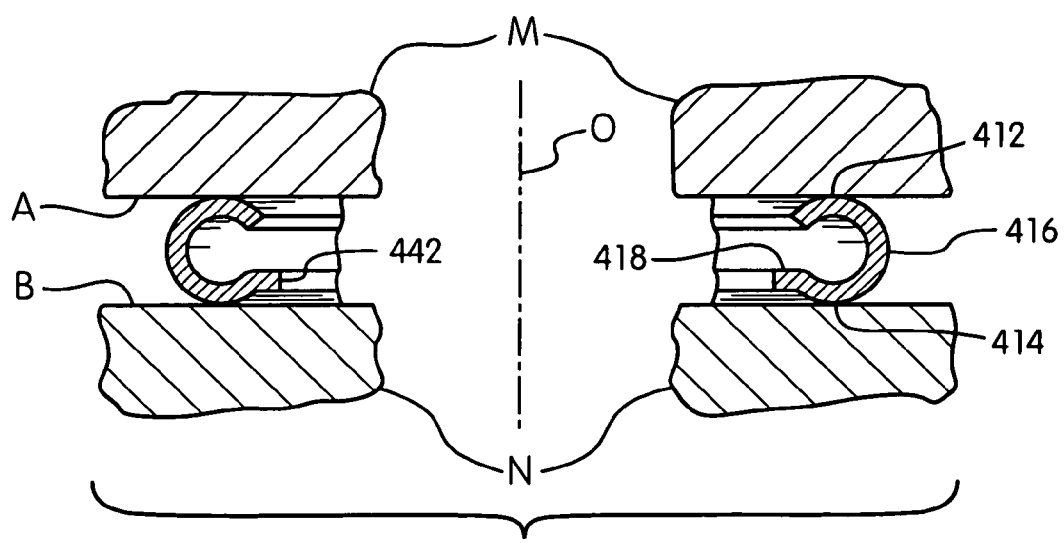
FIG. 20 is an enlarged partial, longitudinal cross-sectional view of the seal illustrated in FIG. 19 as viewed along section line 20—20 of FIG. 19, with the seal installed in a joint between a pair of annular, axially facing surfaces of a pair of members that are coupled together.

Referring now to FIGS. 19 and 20, an internally pressure-energized seal 410 in accordance with a fourth embodiment of the present invention will now be explained. The parts of the fourth embodiment that are identical to the parts of the first embodiment will be given the same reference numerals as the parts of the first embodiment. The seal 410 of this fourth embodiment is basically identical to the seal 210 of the second embodiment, except the seal 410 is designed to be internally pressure energized. In other words, the seal 410 of this fourth embodiment has a reversed cross-sectional shape such that the seal 410 can be internally pressure-energized, as best seen in FIG. 20. In view of the similarity between the second and fourth embodiments, this fourth embodiment will not be discussed and/or illustrated in detail herein. Rather, the following descriptions and illustrations will focus mainly on the differences between this fourth embodiment and the second embodiment. Accordingly, it will be apparent to those skilled in the art from this disclosure that the descriptions and illustrations of the second embodiment also apply to this fourth embodiment, except as explained and illustrated herein.

The seal 410 basically includes a first annular leg portion 412, a second annular leg portion 414 and a central annular portion 416. The first annular leg portion 412 has a cross-sectional shape identical the first annular leg portion 12 of the second embodiment, except the first annular leg portion 412 extends radially inwardly from the central annular portion 416. Similarly, the second annular leg portion 414 has a cross-sectional shape identical to the second annular leg portion 214 of the second embodiment, except the second annular leg portion 414 extends radially inwardly from the central annular portion 416. Thus, the second annular leg portion 414 includes a second free end 442 with an annular flange 418 having a plurality of tabs identical tabs 420. Each of the tabs 420 preferably has an axially extending openings 421 formed therein. Preferably, each axial opening 421 is formed as an open ended slot. The flange 418 and the tabs 420 extend radially inwardly from the second annular leg portion 414 toward the central axis O of the seal 410. In other words, the annular flange 418 is basically identical to the annular flange 218 of the second embodiment, except the annular flange 418 extends radially inwardly. Of course, it will be apparent to those skilled in the art from this disclosure that the cross-sectional shape of the annular flange 418 needs to be slightly modified at the corners of the seal 410 in order to accommodate the reversed tabs 420.

The seal 410 is basically manufactured using the method described above in reference to the seal 10 of the first embodiment. However, it will be apparent to those skilled in the art that the metal forming machine described above would have to be slightly modified (i.e., re-tooled) in order to create the modified shape of the seal 410. In particular, due to the reversed arrangement of the seal 410, the first annular edge (i.e., a first free end surface 438 of the first annular leg portion 412) is moved axially and radially inwardly relative to the central axis O of the seal 410 during the bending of the portion of the metal sheet material such that the first and second annular leg portions 412 and 414 extend inwardly from the central annular portion 416 in a radial direction toward the central axis O. Additionally, the first cutting occurs at a radial location further from the central axis O than the second cutting, rather than closer to the central axis O as in the first embodiment.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. For example, the present invention could also be applied to circular seals also, i.e., a circular seal with tabs and/or a flange. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A pressure-energized, metallic seal for sealing axially facing annular surfaces, comprising:
    a central annular portion extending around a central axis, said central annular portion having a first end and a second end;
    a first annular leg portion extending from said first end of said central portion to an annular first free end, said first annular leg portion having a first annular convex sealing surface lying in a first sealing plane that is perpendicular to said central axis; and
    a second annular leg portion extending from said second end of said central portion to a second free end, said second annular leg portion having a second annular convex sealing surface lying in a second sealing plane that is perpendicular to said central axis, said second free end of said second leg portion having an annular flange extending parallel to said first and second sealing planes and offset from said second sealing plane in an axial direction towards said first sealing plane, said annular flange extending beyond said annular first free end of said first annular leg portion such that said annular flange is exposed when viewed in an axial direction from said first sealing plane toward said second sealing plane,
    said central annular portion, said first annular leg portion, said second annular leg portion and said annular flange are formed as a monolithic member.

2. A pressure-energized, metallic seal for sealing axially facing annular surfaces, comprising:
    a central annular portion extending around a central axis, said central annular portion having a first end and a second end;
    a first annular leg portion extending from said first end of said central portion to an annular first free end, said first annular leg portion having a first annular convex sealing surface lying in a first sealing plane; and
    a second annular leg portion extending from said second end of said central portion to a second free end, said second annular leg portion having a second annular convex sealing surface lying in a second sealing plane, said second free end of said second lea portion having an annular flange extending substantially parallel to said first and second sealing planes and offset from said second sealing plane in an axial direction towards said first sealing plane, said annular flange of said second free end extending in a radial direction away from said central annular portion at least as far as said first free end,
    said annular flange of said second free end including at least one radially extending tab projecting further in said radial direction than adjacent parts of said annular flange.

3. The pressure-energized, metallic seal according to claim 2, wherein
    said tab includes an axial opening formed therein.

4. The pressure-energized, metallic seal according to claim 2, wherein
    said tab includes an open ended slot formed therein.

5. The pressure-energized, metallic seal according to claim 1, wherein
    said annular flange of said second free end includes a plurality of radially extending tabs projecting further than adjacent parts of said annular flange.

6. The pressure-energized, metallic seal according to claim 5, wherein
    said plurality of tabs are peripherally spaced from each other.

7. The pressure-energized, metallic seal according to claim 6, wherein
    said annular flange of said second free end includes four of said tabs.

8. The pressure-energized, metallic seal according to claim 7, wherein
    said seal is substantially rectangular shaped as viewed along said central axis with one of said tabs located at each corner.

9. The pressure-energized, metallic seal according to claim 7, wherein
    at least two of said tabs have an axial hole formed therein.

10. The pressure-energized, metallic seal according to claim 7, wherein
    at least two of said tabs have an open ended slot formed therein.

11. The pressure-energized, metallic seal according to claim 1, wherein
    said seal has a substantially C-shaped transverse cross-sectional profile as viewed in a peripheral direction.

12. The pressure-energized, metallic seal according to claim 1, wherein
    said seal is substantially rectangular shaped with rounded corners as viewed along said central axis.

13. The pressure-energized, metallic seal according to claim 1, wherein
    said seal has a non-circular shape as viewed along said central axis.

14. The pressure-energized, metallic seal according to claim 1, wherein
    said first and second annular leg portions extend outwardly from said central annular portion in a radial direction away from said central axis.

15. The pressure-energized, metallic seal according to claim 1, wherein
    said first and second annular leg portions extend inwardly from said central annular portion in a radial direction toward said central axis.

16. A pressure-energized, metallic seal for sealing axially facing annular surfaces, comprising:
    a central annular portion extending around a central axis, said central annular portion having a first end and a second end;

a first annular leg portion extending from said first end of said central portion to an annular first free end, said first annular leg portion having a first annular convex sealing surface lying in a first sealing plane; and a second annular leg portion extending from said second end of said central portion to a second free end, said second annular leg portion having a second annular convex sealing surface lying in a second sealing plane, said second free end having at least one radially extending tab projecting further than adjacent parts of said seal.

17. The pressure-energized, metallic seal according to claim 16, wherein
said tab includes an axial opening formed therein.

18. The pressure-energized, metallic seal according to claim 16, wherein
said tab includes an open ended slot formed therein.

19. The pressure-energized, metallic seal according to claim 16, wherein
said second free end of said second leg portion includes a plurality of radially extending tabs projecting further than adjacent parts of said seal.

20. The pressure-energized, metallic seal according to claim 19, wherein
said plurality of tabs are peripherally spaced from each other.

21. The pressure-energized, metallic seal according to claim 20, wherein
said second free end of said second leg portion includes four of said tabs.

22. The pressure-energized, metallic seal according to claim 21, wherein
said seal is substantially rectangular shaped as viewed along said central axis with one of said tabs located at each corner.

23. The pressure-energized, metallic seal according to claim 21, wherein
at least two of said tabs have an axial hole formed therein.

24. The pressure-energized, metallic seal according to claim 21, wherein
at least two of said tabs have an open ended slot formed therein.

25. The pressure-energized, metallic seal according to claim 16, wherein
said seal has a substantially C-shaped transverse cross-sectional profile as viewed in a peripheral direction.

26. The pressure-energized, metallic seal according to claim 16, wherein
said central portion, said first leg portion and said second leg portion are constructed together as a one-piece, unitary member.

27. The pressure-energized, metallic seal according to claim 16, wherein
said seal is substantially rectangular shaped with rounded corners as viewed along said central axis.

28. The pressure-energized, metallic seal according to claim 16, wherein
said seal has a non-circular shape as viewed along said central axis.

29. The pressure-energized, metallic seal according to claim 16, wherein
said first and second annular leg portions extend outwardly from said central annular portion in a radial direction away from said central axis.

30. The pressure-energized, metallic seal according to claim 16, wherein
said first and second annular leg portions extend inwardly from said central annular portion in a radial direction toward said central axis.

31. A method of manufacturing a pressure-energized, metallic seal, comprising:
feeding a metal sheet material into a sheet metal forming machine;
cutting a first annular edge of the pressure-energized, metallic seal in the metal sheet material that extends around a central axis;
bending a portion of the metal sheet material to form a cross-sectional profile of the pressure-energized, metallic seal that includes
a central annular portion extending around the central axis, the central annular portion having a first end and a second end,
a first annular leg portion extending from the first end of the central portion to an annular first free end with the first annular edge, the first annular leg portion having a first annular convex sealing surface lying in a first sealing plane that is perpendicular to the central axis, and
a second annular leg portion extending from the second end of the central portion, the second annular leg portion having a second annular convex sealing surface lying in a second sealing plane that is perpendicular to the central axis; and
cutting a second annular edge of the pressure-energized, metallic seal in the metal sheet material to form a second free end of the second leg portion having an annular flange extending parallel to the first and second sealing planes and offset from the second sealing plane in an axial direction towards the first sealing plane such that the central annular portion, the first annular leg portion, the second annular leg portion and the annular flange are formed as a monolithic member,
the cutting of the second annular edge of the pressure-energized, metallic seal occurs at a radial position such that the annular flange of the second free end extends beyond the annular first free end of the first annular leg portion and such that the annular flange is exposed when viewed in an axial direction from the first sealing plane toward the second sealing plane.

32. The method of manufacturing the pressure-energized, metallic seal according to claim 31, wherein
the bending of the portion of the metal sheet material is performed using an automated progressive pressing operation.

33. The method of manufacturing the pressure-energized, metallic seal according to claim 31, wherein
the cutting of the first annular edge of the pressure-energized, metallic seal occurs before the bending of the portion of the metal sheet material; and
the bending of the portion of the metal sheet material occurs before the cutting of the second annular edge of the pressure-energized, metallic seal.

34. The method of manufacturing the pressure-energized, metallic seal according to claim 31, wherein
the cutting of the second annular edge of the pressure-energized, metallic seal creates at least one radially extending tab that projects in a radial direction from the annular flange, the at least one tab projecting further in the radial direction than adjacent parts of the annular flange.

35. The method of manufacturing the pressure-energized, metallic seal according to claim 34, further comprising
cutting an axial opening in the at least one tab.

36. The method of manufacturing the pressure-energized, metallic seal according to claim 34, further comprising
cutting an open ended slot in the at least one tab.

37. The method of manufacturing the pressure-energized, metallic seal according to claim 31, wherein
the cutting of the second annular edge of the pressure-energized, metallic seal creates a plurality of radially extending, peripherally spaced tabs that project in a radial direction from the annular flange, the tabs projecting further in the radial direction than adjacent parts of the annular flange.

38. The method of manufacturing the pressure-energized, metallic seal according to claim 37, wherein
the cutting of the second annular edge of the pressure-energized, metallic seal creates four of the tabs.

39. The method of manufacturing the pressure-energized, metallic seal according to claim 38, further comprising
cutting an axial hole in at least two of the tabs.

40. The method of manufacturing the pressure-energized, metallic seal according to claim 38, further comprising
cutting an open ended slot in at least two of the tabs.

41. The method of manufacturing the pressure-energized, metallic seal according to claim 31, wherein
the bending of the portion of the metal sheet material creates a substantially C-shaped transverse cross-sectional profile as viewed in a peripheral direction.

42. The method of manufacturing the pressure-energized, metallic seal according to claim 31, wherein
the cutting the first annular edge of the pressure-energized, metallic seal creates a non-circular shape as viewed along the central axis; and
the cutting the second annular edge of the pressure-energized, metallic seal creates a non-circular shape as viewed along the central axis.

43. The method of manufacturing the pressure-energized, metallic seal according to claim 31, wherein
the first annular edge is moved axially and radially outwardly relative to the central axis during the bending of the portion of the metal sheet material such that the first and second annular leg portions extend outwardly from the central annular portion in a radial direction away from the central axis.

44. The method of manufacturing the pressure-energized, metallic seal according to claim 31, wherein
the first annular edge is moved axially and radially inwardly relative to the central axis during the bending of the portion of the metal sheet material such that the first and second annular leg portions extend inwardly from the central annular portion in a radial direction toward the central axis.

45. The method of manufacturing the pressure-energized, metallic seal according to claim 31, wherein
the cutting of the second annular edge of the pressure-energized, metallic seal occurs at a radial position such that the annular flange of the second free end extends in a radial direction away from the central annular portion beyond the first free end by a distance no larger than a thickness of the seal.

46. A method of manufacturing a pressure-energized, metallic seal, comprising:
feeding a metal sheet material into a sheet metal forming machine;
cutting a first annular edge of the pressure-energized, metallic seal in the metal sheet material that extends around a central axis;
bending a portion of the metal sheet material to form a cross-sectional profile of the pressure-energized, metallic seal that includes
a central annular portion extending around the central axis, the central annular portion having a first end and a second end,
a first annular leg portion extending from the first end of the central portion to an annular first free end with the first annular edge, the first annular leg portion having a first annular convex sealing surface lying in a first sealing plane, and
a second annular leg portion extending from the second end of the central portion, the second annular leg portion having a second annular convex sealing surface lying in a second sealing plane; and
cutting a second annular edge of the pressure-energized, metallic seal in the metal sheet material to form a second free end of the second leg portion having at least one radially extending tab projecting further than adjacent parts of the seal.

47. A method of manufacturing a pressure-energized, metallic seal, comprising:
feeding a metal sheet material with a substantially uniform thickness into a sheet metal forming machine;
cutting a first annular edge of the pressure-energized, metallic seal in the substantially uniform thickness metal sheet material that extends around a central axis;
bending a portion of the substantially uniform thickness metal sheet material to form a cross-sectional profile of the pressure-energized, metallic seal that includes
a central annular portion extending around the central axis, the central annular portion having a first end and a second end,
a first annular leg portion extending from the first end of the central portion to an annular first free end with the first annular edge, the first annular leg portion having a first annular convex sealing surface lying in a first sealing plane, and
a second annular leg portion extending from the second end of the central portion, the second annular leg portion having a second annular convex sealing surface lying in a second sealing plane; and
cutting a second annular edge of the pressure-energized, metallic seal in the substantially uniform thickness metal sheet material to form a second free end of the second leg portion having an annular flange extending substantially parallel to the first and second sealing planes and offset from the second sealing plane in an axial direction towards the first sealing plane such that the central annular portion, the first annular leg portion, the second annular leg portion and the annular flange have the same substantially uniform thickness,
the cutting of the second annular edge of the pressure-energized, metallic seal occurs at a radial position such that the annular flange of the second free end extends radially beyond the first free end by a distance no larger than the substantially uniform thickness.

48. A pressure-energized, metallic seal for sealing axially facing annular surfaces, comprising:
a central annular portion extending around a central axis, said central annular portion having a first end and a second end;
a first annular leg portion extending from said first end of said central portion to an annular first free end, said first annular leg portion having a first annular convex sealing surface lying in a first sealing plane; and a second annular leg portion extending from said second end of said central portion to a second free end, said second annular leg portion having a second annular convex sealing surface lying in a second sealing plane, said second free end of said second leg portion having an annular flange extending substantially parallel to said first and second sealing planes and offset from said second sealing plane in an axial direction towards said first sealing plane, said seal having a substantially uniform thickness with said annular flange projecting radially beyond said first free end by a distance no larger than said thickness.

49. The pressure-energized, metallic seal according to claim 48, wherein
said annular flange of said second free end extends in a radial direction away from said central annular portion at least as far as said first free end.

50. The pressure-energized, metallic seal according to claim 49, wherein
said annular flange of said second free end includes at least one radially extending tab projecting further in said radial direction than adjacent parts of said annular flange.

51. The pressure-energized, metallic seal according to claim 50, wherein
said tab includes an axial opening formed therein.

52. The pressure-energized, metallic seal according to claim 50, wherein
said tab includes an open ended slot formed therein.

53. The pressure-energized, metallic seal according to claim 49, wherein
said annular flange of said second free end includes a plurality of radially extending tabs projecting further than adjacent parts of said annular flange.

54. The pressure-energized, metallic seal according to claim 53, wherein
said plurality of tabs are peripherally spaced from each other.

55. The pressure-energized, metallic seal according to claim 54, wherein
said annular flange of said second free end includes four of said tabs.

56. The pressure-energized, metallic seal according to claim 55, wherein
said seal is substantially rectangular shaped as viewed along said central axis with one of said tabs located at each corner.

57. The pressure-energized, metallic seal according to claim 55, wherein
at least two of said tabs have an axial hole formed therein.

58. The pressure-energized, metallic seal according to claim 55, wherein
at least two of said tabs have an open ended slot formed therein.

59. The pressure-energized, metallic seal according to claim 48, wherein
said seal has a substantially C-shaped transverse cross-sectional profile as viewed in a peripheral direction.

60. The pressure-energized, metallic seal according to claim 48, wherein
said central portion, said first leg portion and said second leg portion are constructed together as a one-piece, unitary member.

61. The pressure-energized, metallic seal according to claim 48, wherein
said seal is substantially rectangular shaped with rounded corners as viewed along said central axis.

62. The pressure-energized, metallic seal according to claim 48, wherein
said seal has a non-circular shape as viewed along said central axis.

63. The pressure-energized, metallic seal according to claim 48, wherein
said first and second annular leg portions extend outwardly from said central annular portion in a radial direction away from said central axis.

64. The pressure-energized, metallic seal according to claim 48, wherein
said first and second annular leg portions extend inwardly from said central annular portion in a radial direction toward said central axis.

* * * * *